Nov. 5, 1957  J. DOWSE ET AL  2,811,745
METHOD AND APPARATUS FOR MAKING BATTERY SEPARATORS
Filed Aug. 28, 1953  3 Sheets-Sheet 1

Inventors:-
Joseph Dowse
Harry Holt, Jr.
By Theodore C. Browne
Robert E. Meyer
attys United States Patent Office 2,811,745
Patented Nov. 5, 1957

2,811,745
METHOD AND APPARATUS FOR MAKING BATTERY SEPARATORS

Joseph Dowse and Harry Holt, Junior, Denton, near Manchester, England

Application August 28, 1953, Serial No. 377,207

6 Claims. (Cl. 18—10)

It is essential in most storage battery separators to have uniform rib height. If the ribs are too high, the plates and separators will not fit in the space provided in the battery case, and if too low, the plates are loose and may move and shed paste in the battery during service. Therefore, although the proposal was made several years ago to form battery separators from webs of cellulose or other felting fibers previously impregnated with a solution of an acid-resistant thermosetting resin by rolling ribs in the impregnated web according to normal paper corrugating practice, and finally curing the resin trapped in the web, it has not met with success because rib height cannot be controlled to a commercially acceptable degree. The reason is that the most useful acid-proofing resins are condensation polymers which release water as they polymerize. These resins are also viscous, fluid substances in the first stages of heating. Thus, even if the rolling apparatus has formed accurately dimensioned ribs in the uncured web, the combined effect of a momentarily fluid impregnant and the release of water in-situ allows the deformed, but unconfined ribs to change dimensions, and they do so.

A method which achieves accurate control of rib height in such separators was disclosed in U. S. Patent No. 2,626,429 issued January 27, 1953, to Edward Wilson Merrill. That patent describes a method of curing the resin in the separator by first curing the rib under heat and pressure as the rib is being formed and later curing the intermediate or electrolyte-carrying areas of the separator in a subsequent heating step. In the apparatus disclosed by Merrill, this is accomplished by passing the web between a pair of rolls. The bed roll, which is heated to above resin curing temperature, bears transverse slots; the forming roll bears transverse ribbing bars which force the web into only one of the bed roll slots at a time and thus upthrust a rib on the web. The spaces between the slots in the bed roll are cut back so that the web in the space between the ribs floats freely. Were pressure together with heat to be applied at this time, the electrolyte permeability of these areas would be reduced or even destroyed by the flow of the resin. All the resin in the web is subsequently cured by heating the web in the absence of pressure. Thus the electrolyte permeability of the current carrying areas is maintained.

The object of this invention is to make separators, in which the ribs are formed longitudinally instead of transversely in the web.

It will be appreciated that Merrill's bed roll and rib-forming roll which are milled parallel to the axis of the rolls are inherently very expensive pieces of equipment. Generally speaking, only one type of separator may be made from one set of the Merrill rolls. The rolls are slow to manufacture and require expert shop work. The industry, however, requires a great variety of separators in a great variety of separator sizes, rib widths and rib heights. The cost advantage of rolls which can be turned on a lathe rather than made by the expensive milling procedure which is demanded by rolls of the Merrill design is very large.

Longitudinal ribbing machines usually consist of a drum provided with slots over which a bank of rollers is set. The first roll of the series bears one or at a maximum, two ribbing fins, and as the series progresses around the bed roll, two more ribbing fins are added to each successive roll until, when the final roll in the bank is reached, the entire width of the web has been corrugated or ribbed.

When it was attempted to form separators on such a machine, several severe difficulties arose. If, for example, the full molding pressure was applied by the first roll, the ribs stuck in the slot and either were cracked or torn or substantial areas of the surface of the web were lifted off. This is due to the fact that commercial resins, although they may be designated as having a definite molecular weight, actually contain a wide range of more or less polymerized resin particles. The stated molecular weight is an average figure. Some of the low weight members are volatile at temperatures which are necessary to cure the resin. As the web passes over hot rolls, the low members of the molecular series volatilize, their vapors polymerize, cake on the hot roll and form sticky deposits on the cooler parts of the mechanism. The deposit quickly builds up on the bottom of the bed roll slot where there is no relative motion to scour it free as the deposit forms. Very shortly, the tops of the ribs are punctured by the resin deposits or the web is cracked or torn.

In addition, as the web moves inwards laterally towards its center from its margins as the successive ribs are being formed, it sticks on the surface of the drum. Cuts appear along the margins of the ribs, for the weak, lofty web which must be used if sufficient electrolyte permeability is to be achieved cannot withstand the lateral pull and hence splits.

Webs having sufficient electrolyte permeability have bulk densities of less than about 20 pounds per cubic foot, whereas webs on which ordinary corrugating machines are designed to operate have bulk densities in excess of 50 pounds per cubic foot or at least 2½ times the permitted density. The resin content of the web lies between 20 and 50% by weight of the fiber. It can, therefore, be appreciated how easily the web may be compressed and the resin caused to flow and seal off a significant portion of the permeable areas. Also, because the resin becomes sticky before it polymerizes, it can easily be seen that pressure contact of the web with relatively moving rolls, such as occurs in conventional corrugating equipment, will tear large pieces from the surface of the web.

By modifying the machinery and particularly by taking care that no increasing strain is imposed while the web is soft and tender, we have succeeded in forming ribs in battery separator web material between hot rolls for continuous runs of twelve hours or more without sticking, tearing, or forming pinholes through the separator while maintaining commercially accurate dimensions throughout the runs.

The machine

Figure 1:
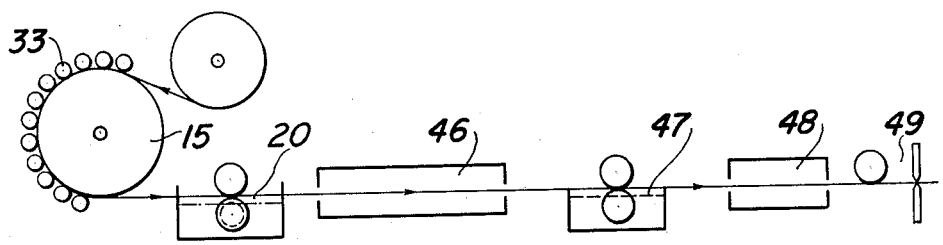
Figure 1 is a diagrammatic view illustrating the process of forming battery separators.

The machine comprises two spaced side frames 10 and 11, which carry the main shaft journals 12 and 13. Shaft 14 carries the ribbing drum 15, driving gear 16, and the main driving pulley 17 rigidly affixed to the shaft.

The ribbing drum

The ribbing drum 15 is of large diameter compared with that of the ribbing rollers 33 and comprises a shell 18, having a cylindrical face 19 arranged to be heated to temperatures as high as 700° F. Conveniently, heating may be accomplished by electrical strip heaters 21, arranged about the inner wall of the drum. If electrical heating is used, slip ring assemblies 22 are affixed to the main shaft, and the drum is then supported by the spider assembly 23, which extends from the interior drum walls to the hub 24.

The drum may also be heated by hot fluid, in which case drum ends are welded to the extremities of the shell and form the support for the drum. The shaft is appropriately bored, and fluid is led into and out of the drum in the usual manner of hot drum heating.

Figure 2:
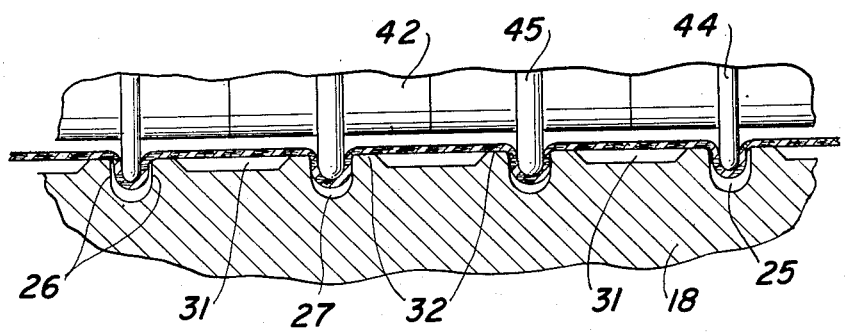
Figure 2 is an enlarged partial view in elevation and section showing the ribbing roll, web, and ribbing drum.

The cylindrical face of the ribbing drum is provided with a plurality of parallel, circumferential ribbing slots 25 (see Figure 2), the number of which is determined by the number of ribs which it may be desired to form in the battery separator. The slots are cut with parallel walls 26, 26 and, preferably to better resist the strains which develop from alternate heating and cooling, terminate in a full radius 27 at the bottom of the slots. The width of the slots is determined by the width of the rib which it is intended to form.

Figure 3:
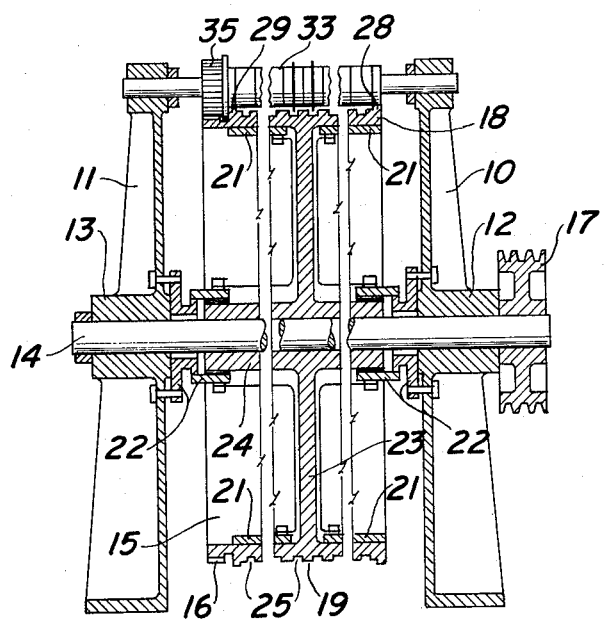
Figure 3 is a vertical section through the ribbing machine.
Figure 4:
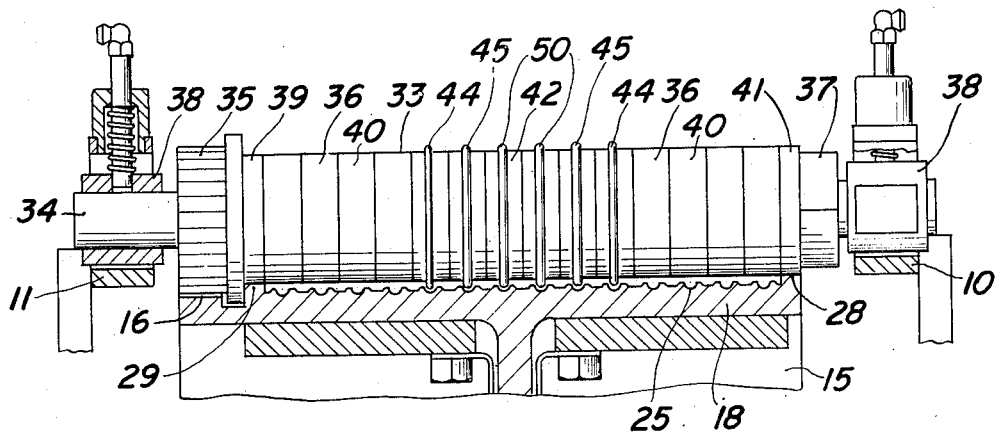
Figure 4 is an elevation of one ribbing roll showing a portion of the ribbing drum in section.

As the drawing shows (Figures 3 and 4), two cylindrical bearer faces 28 and 29 are turned on the drum at the opposite extremities of the cylinder, and between each slot, the cylindrical face of the drum is grooved as shown at 31, 31, leaving only a narrow land 32 at the margin of the slot. These intermediate or clearance grooves may be of any convenient depth. Usually fifteen to twenty-five thousandths of an inch is sufficient. Only that portion of the web which touches the extremely narrow face of the land comes in contact with the heated drum.

Rib-forming rollers

The web is rolled into the slots 25 in the shell 18 of the heated drum 15 by a series of rib-forming rollers 33, which are equipped with fins 44 and 45, lying in the middle plane of the slots in the drum. The fins on the rollers are arranged in echelon; that is, the first roll in the series to meet the web has one or at the most two fins (the number depends on whether an odd or an even number of ribs is to be formed in the separator). Each succeeding roll in the series has progressively two more fins; for example, if the first roll carries one fin, the second roll carries three fins which enter the three middle slots in the drum, and so on, throughout the series until each slot in the drum is occupied. Each roll is made up from a shaft 34, a roll-driving pinion 35, which meshes with the main drive gear 16, and a group of collars 36, 36, which are locked onto the shaft by the nut 37. The shafts 34 are carried by spring-pressed journals 38, 38, mounted in the side frames 10 and 11.

The first and last collars, the bearer collars, 39 and 41 on each roll determine the clearance between the ribbing rolls 33 and the drum. They have finished faces, and run on the bearers 28 and 29 and are of identical diameter throughout the series. The bearer collars are changed only when it is desired to run a web of different thickness. In this case, other collars are substituted which will provide the proper clearance. The remaining collars are either spacers 40 or finned collars 42. Building up the rolls from individual collars permits the machine to be quickly adjusted to produce ribs of different heights or to be adapted to run webs of different thicknesses. In the figures the clearance between the rolls and the drum is exaggerated for clarity.

The machine is driven from the pulley 17. Preferably, the drive from the motor includes a variable speed device. The connection to the power source is made by V belts. Power and driving elements are not shown in the drawings.

The ribbing operation

In respect to each rib, the first fin to engage the web and force it into the slot, the folding fin 44, is narrow enough that ample clearance is provided for the web to move into the slot 25. The second fin, a preliminary sizing fin 45, engages the partially deformed rib and pushes it against the sides 26, 26 of the slot 25 but not against the bottom 27. The third and subsequent fins for each rib are holding fins 50, which maintain the rib in contact with the side walls 26, 26 of the slot. As will be explained in detail later, while the approximate dimensions of the rib are imposed by the folding and preliminary sizing fins, the final dimensions are imposed by the last several fins in each series known as sizing fins.

As our preferred example, a typical roll setup used for making separators having a rib height of 0.072 inch as measured from the back of the separator to the top of the rib and a rib width of 0.096 inch from a web 0.030 inch thick will be used. In such a case, slots 25 will have a width of 0.096 inch. The folding fin 44 in each case is 0.028 inch wide and 0.073 inch deep as measured from the body of the collar on the side toward the previously deformed portion of the web. The clearance between this portion of the collar, the inboard portion, and the land 32 is adjusted by means of bearer collars 39 and 41 to be slightly (about 0.005 inch) in excess of the thickness of the web. The radius of the outboard portion of the collar of the folding fin and of spacing collars 40 is reduced about 0.010 inch from that of the inboard portion in order to provide ample clearance for the web so that the web may be drawn inwardly from its margins without restraint as the ribs are being formed. The radius of the collar for each subsequent fin is that of the inboard portion of the collar of the folding fin. Of course, if an odd number of ribs are to be formed so that only a single rib is formed at the first roll, then both portions of the collar of this single folding fin are of the reduced diameter.

The preliminary sizing fin 45 in order to engage the sides of the rib against the sides 26, 26 of the slot 25 is 0.035 inch wide. This fin has a depth as measured from the collar of 0.073 inch. The subsequent holding fins 50 are also 0.035 inch wide, but the depth of these fins, which should not exceed that of the preliminary sizing fin, may be less than that of the preliminary sizing fin, provided this lesser depth is at least a major proportion of the desired rib height. For example, in this instance we prefer to use holding fins having a fin depth of 0.065 inch.

If ten ribs are to be formed in the separator, then the fin collars are arranged in the following manner. The rolls are numbered in progression as the web passes beneath, making the first roll to contact the web roll 1, and the slots and corresponding fins are numbered in progression across the drum.

Roll 1 has folding fins in slots 5 and 6.

Roll 2 has folding fins in slots 4 and 7 and preliminary sizing fins in slots 5 and 6.

Roll 3 has folding fins in slots 3 and 8, preliminary sizing fins in slots 4 and 7, and holding fins in slots 5 and 6.

Roll 4 has folding fins in slots 2 and 9, preliminary sizing fins in slots 3 and 8, and holding fins in slots 4, 5, 6, and 7.

Roll 5 has folding fins in slots 1 and 10, preliminary sizing fins in slots 2 and 9, and holding fins in slots 3, 4, 5, 6, 7, and 8.

Roll 6 has preliminary sizing fins in slots 1 and 10 and holding fins in slots 2, 3, 4, 5, 6, 7, 8, and 9.

Roll 7 and the subsequent rolls, until such time as sizing fins are used, have holding fins in all of the slots.

If the temperature of the drum is at a level sufficiently high to cause polymerization of the resin, for example 650° F., polymerization of the resin which impregnates the web begins practically at once. By the time the second fin has forced the web into contact with the walls of the slot, water has been released in the condensation reaction, the resin has become viscous, and the web, consequently, is tender. We find that no more distortion should be attempted until the tender stage has passed, or tearing will take place. Indeed, as pointed out above, we prefer to reduce the length of the projections of the holding fins, which contact the web during this tender stage, until such time as the resin approaches its "C" or infusible stage in order to insure that no such further distortion will occur in this stage. The "C" stage is approached with a drum having a diameter of 4 feet operating at a peripheral speed of 100 feet per minute and a temperature of 650° F. and with the rolls having a center line spacing of about 3 inches at approximately the sixteenth roll. A variation of peripheral speed of 10 feet per minute will change this position by about one roll. Temperature variations will cause similar variations in roll position since the polymerization of the resin is a time-temperature function.

At the approach of the resin to the "C" stage, the final rib dimensions may be imposed upon the separator, since the advance of the polymerization of the resin is sufficient to give the web strength enough to resist tearing. However, no further distortion should be attempted after the resin has become so advanced that it loses its thermoplastic properties and becomes infusible. Under the conditions given above, this occurs at about the twenty-first or twenty-second roll. For this reason, the final sizing should take place between the sixteenth and twenty-first rolls. Once the final rib size has been imposed at this point the ribs become essentially dimensionally stable and no further restraint, such as that imposed by the fins, is necessary until the web is stripped from the drum.

While theoretically it may appear preferable to arrange the sizing fins in an echelon similar to that used in forming the ribs, this is not, as a practical matter, necessary since the resin remains in this induction stage between the point where it imparts sufficient strength to the web and where it becomes infusible for a sufficient period to permit all of the ribs to be sized simultaneously.

Thus to make separators having the 0.072 inch rib height of the example, sizing fins having a depth of 0.073 inch and a width of 0.035 inch are used in all positions in the seventeenth, eighteenth, and nineteenth rolls. In addition, certain minor variations of the rib height may be imposed upon the separators at this point. For example, a separator having a rib height of 0.076 inch may be made using the same arrangement of folding, preliminary sizing and holding fins merely by rearranging the sizing fins. In this case, fins having a depth of 0.073 inch and a width of 0.035 inch are used in all positions on the seventeenth roll, and fins having a depth of 0.076 inch and a width of 0.035 inch are used in all positions on the eighteenth, nineteenth, and twentieth rolls. In addition, separators may be made having a rib height of 0.078 inch, by replacing the fins used in the nineteenth and twentieth rolls of the setup used to make separators having a rib height of 0.076 inch with fins having a depth of 0.080 inch and a width of 0.035 inch. This latter example appears to represent the maximum practical limit to which this manner of varying the rib height may be extended. To make separators having ribs of other heights, a complete new setup would be required. In each of the above examples, no further rolls are used beyond those enumerated.

The sequence of operations, therefore, is a tucking of the web into the slot by the first fin, ironing the rib with a full-dimension fin, preferably by the second fin only, holding the rib in the slot, preferably by reduced diameter holding fins until the final set stage of resin is closely approached, then giving final form to the rib by passing it under a series of full-dimension fins as the final step of curing the ribs. The fact that the tops of the ribs do not bottom and that this machine practices neither closed-molding nor distortion-before-cure techniques but something intermediate between the two gives a peculiar result. The height of the rib in the final production is considerably less than the amount of the distortion of the web during the process. Nevertheless, although the rigidly imposed dimensions at the time of cure, which are characteristic of closed-molding, are not secured, the indefinite, unpredictable dimensions characteristic of the distortion-before-cure process are avoided.

"Spring-back" or the change in rib height, which occurs as the web leaves the drum, is predictable and uniform. It has been determined empirically for numerous rib heights and has been found to approximate quite closely the original thickness of the web. The reason for this is unexplained. The example given will produce a separator with a rib height of seventy-two thousandths, which is dependable and uniform, but it will be noticed that approximately thirty thousandths of an inch of the total distortion of the web measured from the back of the web to the top of the rib has disappeared in the "spring-back."

Changing either the speed or the drum temperature by significant amounts will require other roll arrangements. More rolls will be necessary if the speed, but not the temperature, is increased. If the speed is reduced, some of the holding rolls may be eliminated.

Figure 5:
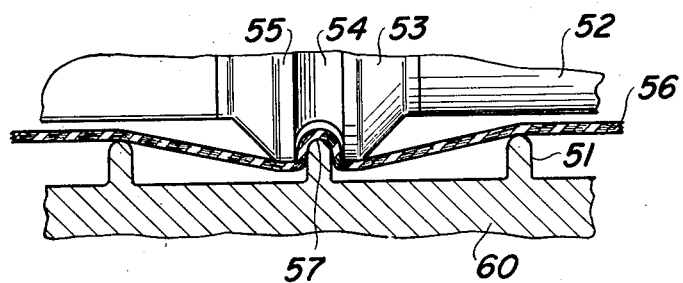
Figure 5 is an enlarged partial view in elevation and section, showing an alternative form of the ribbing roll in position 1, the web, and ribbing drum.
Figure 6:
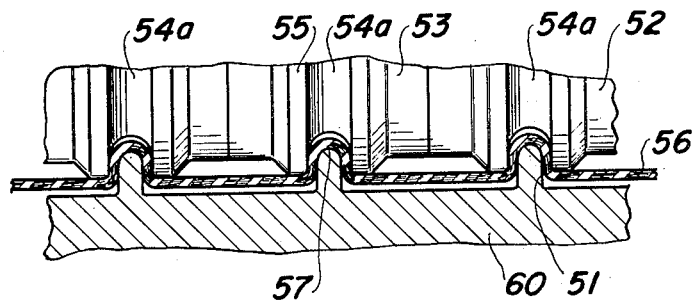
Figure 6 is an enlarged partial view in elevation and section, showing a roll in positions No. 16 to 21.

Details of an alternate form of ribbing machine are illustrated in Figures 5 and 6. The purpose, mechanical arrangement, method of roll drive, drum heating and construction of the rolls from a series of collars are identical with the machine which has been described. The drum, however, instead of bearing ribbing slots carries the ribbing fins. The rolls in this instance are the slotted members. Since the alternative form is essentially the reversal of the relative position of the slots and the fins, to save repetition the machine will not be described in detail.

The drum 60 carries a series of ribbing fins 51 on its periphery. The fins may be machined on the face of the drum or they may be circumferential bands of metal which are attached to its cylindrical face. The rolls 52, which are arranged about the drum in the manner which has previously been described, bear rib-forming collars 53 which are provided with rib-forming slots 54. These collars bear a narrow land 55 immediately adjacent to the slot and then taper to a reduced diameter to provide clearance for the web 56 as it is drawn inwardly from its margins. As before, this clearance is to prevent the premature cure of the resin in the electrolyte permeable areas of the separator.

For comparison, an example of drum and forming rolls will be described which produce separators in the same size range as that of the example described above. To produce separators having a rib height of 0.072 inch as measured from the back of the separator to the top of the rib and a rib width of 0.096 inch from a web of material 0.030 inch thick, each rib 51 on the drum 60 is made to be 0.035 inch in width and approximately 0.120 inch in height measured from the root to the crest of the rib. The first rib-forming roll to meet the web carries but one rib-forming collar. Its slot 54 is 0.101 inch wide. The slotted collars which perform the web-holding operation and those collars which, as the "C" stage of cure of the resin is being approached, impose the final dimensions on the rib (namely, collars on the rolls in the sixteenth to twentieth roll position) carry slots 54a which are 0.096 inch wide. Adjustment of rib height is secured by the bearer collars located at the ends of the rolls and running on the drum bearers in the manner which has previously been described. Measuring the roll setting from the face of the land 55 to the crest 57 of the rib 51, the first or folding roll should have its lands set about 0.065 inch below the rib crest 57. The final or sizing rolls should be set to hold the lands 55 about 0.080 inch below the rib crest 57.

The remaining operations to form the finished separator follow generally the practice described in the Merrill patent.

As the web leaves the roll, the tops of the ribs are usually coated with additional resin by the kiss coater 20 to provide extra protection for that part of the separator which touches the positive plate. The web then passes through a heated tunnel 46 where the resin in the areas between the ribs and on the tops of the ribs is cured.

Following the curing step, the web passes through a bath 47 of a wetting agent. The web is then dried by passing through a drying tunnel 48, and then passes through a guillotine 49 where proper lengths are cut off. Inspection and packaging follow.

We claim:

1. An apparatus for continuously deforming webs of resin impregnated sheet material to form ribbed battery separators therefrom comprising a forming drum having a solid rim, a series of rolls arranged about a substantial portion of the periphery of said drum, each of said rolls having its axis of rotation parallel to that of said drum, means for passing said sheet material between said drum and said rolls, means for heating said drum and power means for driving said drum and said rolls, said drum having a series of parallel, circumferential rib forming grooves arranged on the periphery thereof, each of said rolls having a series of parallel, circumferential rib forming fins arranged on the periphery thereof, said fins being disposed to register with said grooves, the rib forming fins on the leading rolls of said series of rolls being arranged in echelon whereby the web of sheet material as it passes between said drum and said roll is first deformed into said grooves by said fins in the middle area and then is progressively deformed outwardly toward each side of said web, the drum being recessed between the grooves thereon to restrict the area of application of pressure on the sheet material to substantially that area included between a rib and a groove, and said grooves having a sufficient depth that upon the deformation of the web into a groove by the action of a corresponding fin, no portion of the web makes contact with the bottom of the groove.

2. An apparatus for continuously deforming webs of resin impregnated sheet material to form ribbed battery separators therefrom comprising a forming drum having a solid rim, a series of rolls arranged about a substantial portion of the periphery of said drum, each of said rolls having its axis of rotation parallel to that of said drum, means for passing said sheet material between said drum and said rolls, means for heating said drum and power means for driving said drum and said rolls, said drum having a series of parallel, circumferential rib forming grooves arranged on the periphery thereof, each of said rolls having a series of parallel circumferential rib forming fins arranged on the periphery thereof, said fins being disposed to register with said grooves, the rib forming fins on the leading rolls of said series of rolls being arranged in echelon whereby the web of sheet material as it passes between said drum and said rolls is first deformed into said grooves by said fins in the middle area and then is progressively deformed outwardly toward each side of said web, the drum being recessed between the grooves thereon to restrict the area of application of pressure on the sheet material to substantially that area between a rib and a groove, said grooves having a sufficient depth that upon the deformation of the web into a groove by the action of a corresponding fin, no portion of the web makes contact with the bottom of the groove, the first fin to contact the web in respect to any given groove having a depth sufficient to impress upon the web a rib having the approximate vertical dimension desired in the final separator and a width insufficient to force the web into firm contact with the walls of the groove.

3. An apparatus for continuously deforming webs of resin impregnated sheet material to form ribbed battery separators therefrom comprising a forming drum having a solid rim, a series of rolls arranged about a substantial portion of the periphery of said drum, each of said rolls having its axis of rotation parallel to that of said drum, means for passing said sheet material between said drum and said rolls, means for heating said drum and power means for driving said drum and said rolls, said drum having a series of parallel, circumferential rib forming grooves arranged on the periphery thereof, each of said rolls having a series of parallel, circumferential rib forming fins arranged on the periphery thereof, said fins being disposed to register with said grooves, the rib forming fins on the leading rolls of said series of rolls being arranged in echelon whereby the web of sheet material as it passes between said drum and said rolls is first deformed into said grooves by said fins in the middle area and then is progressively deformed outwardly toward each side of said web, the rib forming fins on all rolls except the first to engage the web being of uniform width and having a dimension sufficient to force the web into contact with the walls of the rib-forming grooves of said drum, said grooves having a sufficient depth that upon the deformation of the web into a groove by the action of a corresponding fin, no portion of the web makes contact with the bottom of the groove.

4. An apparatus for continuously deforming webs of resin impregnated sheet material to form ribbed battery separators therefrom comprising a forming drum having a solid rim, a series of rolls arranged about a substantial portion of the periphery of said drum, each of said rolls having its axis of rotation parallel to that of said drum, means for passing said sheet material between said drum and said rolls, means for heating said drum and power means for driving said drum and said rolls, said drum having a series of parallel, circumferential rib forming grooves arranged on the periphery thereof, each of said rolls having a series of parallel, circumferential rib forming fins arranged on the periphery thereof, said fins being disposed to register with said grooves, the rib forming fins on the leading rolls of said series of rolls being arranged in echelon whereby the web of sheet material as it passes between said drum and said rolls is first deformed into said grooves by said fins in the middle area and then is progressively deformed outwardly toward each side of said web, the first fin to contact the web in respect to any given groove having a depth sufficient to impress upon the web a rib having the approximate vertical dimension desired in the final separator and a width insufficient to force the web into firm contact with the walls of the groove, the rib forming fins on all rolls except the first to engage the web being of uniform width and having a dimension sufficient to force the web into contact with the walls of the rib-forming grooves of said drum, said grooves having a sufficient depth that upon the deformation of the web into a groove by the action of a corresponding fin, no portion of the web makes contact with the bottom of the groove.

5. In the manufacture of a separator for electric storage batteries from a web of paper pulp impregnated with an uncured acid-resistant thermosetting resin in quantity insufficient when cured to impair the desired electrolyte permeability of the separator, the process of forming ribs in the web by rolling the web between cooperating rolls having interfitting fins and grooves characterized by progressively deforming the impregnated web about parallel fins from the middle outwardly toward each edge of the web parallel to the deformation, simultaneously forcing the deformed portion into the cooperating groove, then maintaining the deformations by passing the deformed web under a bank of rollers provided with fins, applying sufficient pressure by means of said fins to the wall area only of the deformations to iron substantially the whole area of the wall of said deformations into contact with the walls of the grooves, simultaneously applying heat to said wall, maintaining heat and pressure against the walls of said deformations for a time sufficient to advance the resin in the walls of the deformed areas substantially to the infusible stage whereby a set of stable, fine ribs are formed in the web, while at all times maintaining that portion of the web which forms the outer top surface of a rib out of contact with the bottom wall of a groove.

6. The process of claim 5 in which in respect to any given rib the deformation of the web to form a rib is characterized by the following steps: deforming the web about a fin into a groove said fin and groove in combination with the web providing a loose fit, ironing the deformed portion of the web to a dimension approximating the final desired dimension and simultaneously forcing the side wall portions of said deformed portion into pressure contact with a heated body, maintaining the side wall portions of said deformed portion in pressure contact with said heated body without further deformation for a time sufficient that the polymerization condition of the resin in the web in the deformed portion advances to substantially its infusible state whereby the web acquires sufficient strength to resist tearing and thereupon imposing the desired final dimension upon the deformed portion of the web.

References Cited in the file of this patent

UNITED STATES PATENTS

| | | |
|---|---|---|
| 311,409 | Butz et al. | Jan. 27, 1885 |
| 2,168,895 | Asnes | Aug. 8, 1939 |
| 2,182,720 | Cannard | Dec. 5, 1939 |
| 2,494,723 | Rowe | Jan. 17, 1950 |
| 2,547,880 | Meyer et al. | Apr. 3, 1951 |